(12) United States Patent
Okada

(10) Patent No.: US 6,971,487 B2
(45) Date of Patent: Dec. 6, 2005

(54) DOUBLE-WRAP BAND BRAKE APPARATUS

(75) Inventor: Masanori Okada, Hamamatsu (JP)

(73) Assignee: NSK-Warner K. K., Tokyo (JP)

( * ) Notice: Subject to any disclaimer, the term of this patent is extended or adjusted under 35 U.S.C. 154(b) by 0 days.

(21) Appl. No.: 10/837,669

(22) Filed: May 4, 2004

(65) Prior Publication Data

US 2004/0222054 A1 Nov. 11, 2004

(30) Foreign Application Priority Data

May 8, 2003 (JP) .............................. 2003-130444

(51) Int. Cl.$^7$ ............................................. F16D 51/00
(52) U.S. Cl. ............................... 188/77 W; 192/107 T
(58) Field of Search ........................ 188/77 W, 77 R, 188/83, 249, 257, 259, 250 B; 192/107 T, 192/80

(56) References Cited

U.S. PATENT DOCUMENTS 5,975,253 A * 11/1999 Umezawa et al. ........ 188/77 R

FOREIGN PATENT DOCUMENTS

| JP | 02299691 A | * 12/1990 | ........... D06F 37/40 |
|----|------------|-----------|----------------------|
| JP | 6-235433 | 8/1994 | |
| JP | 8-219200 | 8/1996 | |
| JP | 09100857 A | * 4/1997 | ........... F16D 69/04 |
| JP | 2000-161391 | 6/2000 | |
| JP | 2001-082513 | 3/2001 | |
| JP | 2001-140954 | 5/2001 | |

* cited by examiner

Primary Examiner—Xuan Lan Nguyen
(74) Attorney, Agent, or Firm—Miles & Stockbridge PC

(57) ABSTRACT

A double-wrap band brake comprises a middle band with a frictional surface on the inner peripheral side, and a pair of outer bands coupled to this middle band and having frictional surfaces on the inner peripheral sides, an anchor bracket, and an apply bracket. The middle band has a first frictional member and a second frictional member disposed on an end portion of the apply bracket and thinner than the first frictional member, and an oil groove extending in the axial direction and between the first frictional member and the second frictional member. The first frictional member has a dynamic pressure groove opened to the oil groove and extending in the circumferential direction.

8 Claims, 8 Drawing Sheets

FIG. 4
FIG. 5
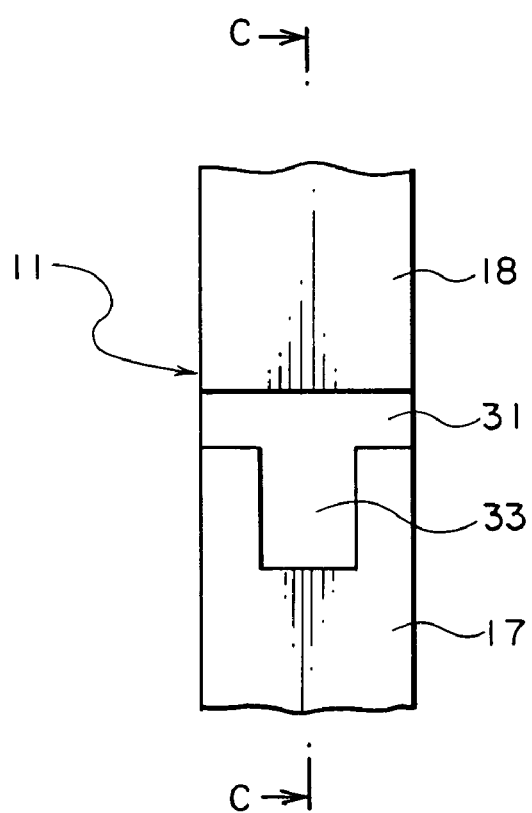
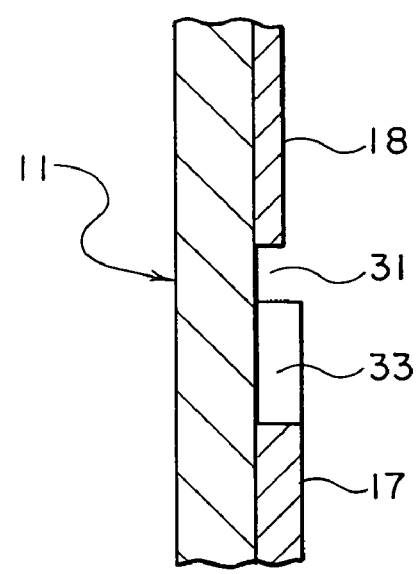

DOUBLE-WRAP BAND BRAKE APPARATUS

This application claims the benefit of Japanese Patent application No. 2003-130444 which is hereby incorporated by reference.

BACKGROUND OF THE INVENTION

1. Field of the Invention

The present invention relates to a double-wrap band brake apparatus used in an automatic transmission, or the like, for a car.

2. Related Background Art

In an automatic transmission for a car or an ordinary industrial machine, a band brake apparatus is widely employed for braking a transmission element or a rotational element. A band brake apparatus usually effects braking by attaching a frictional member onto an inner peripheral surface of a single steel plate formed in an annular shape to serve as a brake band, and contracting this brake band with an actuator, to thereby fasten a transmission element or a rotational element disposed on the inner side thereof. Then, recently, in order to reduce an operational force of the actuator or to improve a brake controllability thereof, there is proposed a double-wrap band brake apparatus using a double-wrap brake band in, for example, Japanese Patent Application Laid-Open No. 6-235433, Japanese Patent Application Laid-Open No. 8-219200, Japanese Patent Application Laid-Open No. 2000-161391, Japanese Patent Application Laid-Open No. 2001-82513, and Japanese Patent Application Laid-Open No. 2001-140954.

A double-wrap brake band 3 is, as shown in FIG. 8 and FIG. 9 (a view seen from the arrow D in FIG. 8) as used for an automatic transmission for a car, comprised, for example, of an annular middle band 11 and a pair of annular outer bands 15 which are joined to this middle band 11 through a coupling plate 13 by welding in a state that the free ends of the outer bands are respectively opposed to the free end of the middle band 11. A comparatively thick first frictional member 17 and a comparatively thin second friction member 18 are attached onto the inner peripheral surface of the middle band 11 (in a range of 90° from the end portion on the apply side), while a frictional member 19 is attached onto the inner peripheral surface of the outer band 15.

An anchor bracket 21 to be latched by an anchor pin 5 on the side of a main body casing 1 is welded to the operational end sides of the outer bands 15, while an apply bracket 25 which receives a force in the direction of contraction of the middle band 11 and the outer bands 15 through a push rod 23 is welded to an operational end side of the middle band 11. In this double-wrap brake band 3, when the apply pin 23 to be driven by an actuator (not shown) is operated in a direction indicated by the arrow in FIG. 9, the middle band 11 and the outer bands 15 are contracted, thereby braking a transmission element (hereinafter called the drum) 27 fitted in the double-wrap brake band 3.

In the conventional double-wrap brake band apparatus described above, when the double-wrap brake band 3 is set on the outer periphery of the drum 27, a portion of the middle band 11 in a range of around 45° to 135° from the apply side end portion is dented inwardly and a portion in a range of around 180° to 270° is swollen outwardly due to the fact that a flexure of the middle band 11 becomes irregular in the circumferential direction. As a result, the first frictional member 17 sometimes comes very close to the drum 27 or comes into contact with the drum 27 at the position of about 90° from the apply side end portion of the middle band 17 (the portion E in FIG. 9).

When the first frictional member 17 comes abnormally close to the drum 27 or comes into contact therewith, a dragging torque is generated upon rotation of the drum 27 due to a viscous resistance or a fluid resistance of an automatic transmission fluid interposed between the first frictional member 17 and the drum 27, thereby causing a loss or the like of the fuel expenses of a car or of a driving torque. Particularly, in the above-described double-wrap brake band apparatus which has the thin second frictional member 18 in the vicinity of the apply side end portion and the thick first frictional member 17 attached to another portion, the automatic transmission fluid flows into a narrow space from a wide space so that the fluid resistance is increased further. As a result, the dragging torque can not be neglected.

SUMMARY OF THE INVENTION

The present invention has been contrived in view of the above circumstances, and an object thereof is to provide a double-wrap band brake apparatus capable of effectively reducing a dragging torque by employing a comparatively simple structure.

In order to achieve the above object, according to the present invention, there is proposed a double-wrap band brake apparatus having a double wrap brake band for serving to brake a rotating member fitted therein, which comprises:

an annular middle band with a frictional surface formed on the inner peripheral side thereof;

a pair of annular outer bands coupled to the middle band in a state that the free ends thereof are respectively opposed to the free end of the middle band and respectively having frictional surfaces formed on the inner peripheral sides thereof;

an anchor bracket fixed on an operational end side of one of the middle band and the outer bands and latched on a main body casing side; and an apply bracket fixed on an operational end side of the other of the middle band and the outer bands to receive a force in the direction of contraction of the middle band and the outer bands from an actuator, wherein:

the middle band has a first frictional member and a second frictional member which is disposed on an end portion side of the apply bracket to be thinner than the first frictional member, and an oil groove extending in the axial direction and formed between the first frictional member and the second frictional member; and the first frictional member is provided with a dynamic pressure groove which is opened to the oil groove and extending in the circumferential direction.

According to the present invention, when, for example, the drum is rotated inside the double-wrap brake band, the middle band is swollen outwardly due to the oil which has entered the dynamic pressure groove to become of a high pressure, thereby reducing the dragging torque generated by the viscous resistance or the fluid resistance, so that a loss of a driving torque may be reduced and fuel economy may be improved.

Also, in the double-wrap band brake apparatus of the present invention, it is preferable that the dynamic pressure groove is formed to extend toward the anchor bracket. With this structure, it is possible to reduce the dragging torque at the deenergy rotation of the rotating member.

In the double-wrap band brake apparatus of the present invention, it is preferable that the depth of the dynamic pressure groove is equal to the thickness of the first frictional member. With this structure, it is possible to increase the capacity of the dynamic pressure groove, to thereby increase the outward swell of the middle band.

In the double-wrap band brake apparatus of the present invention, it is preferable that the oil groove and the dynamic pressure groove are disposed in the vicinity of a position at which the inner peripheral surface of the double-wrap brake band is in contact with or comes closest to the outer peripheral surface of the rotating member in a state that the double-wrap bake band is disposed on the outer periphery of the rotating member. With this structure, the middle band is swollen at the most required position.

BRIEF DESCRIPTION OF THE DRAWINGS

FIG. 4 is an enlarged view of the portion B in FIG. 3;

FIG. 5 is a cross-sectional view taken along line C—C in FIG. 4;

DETAILED DESCRIPTION OF THE PREFERRED EMBODIMENT

An embodiment in which the present invention is applied to a double-wrap band brake apparatus of an automatic transmission for a car will be fully described with reference to the attached drawings.

Figure 1:
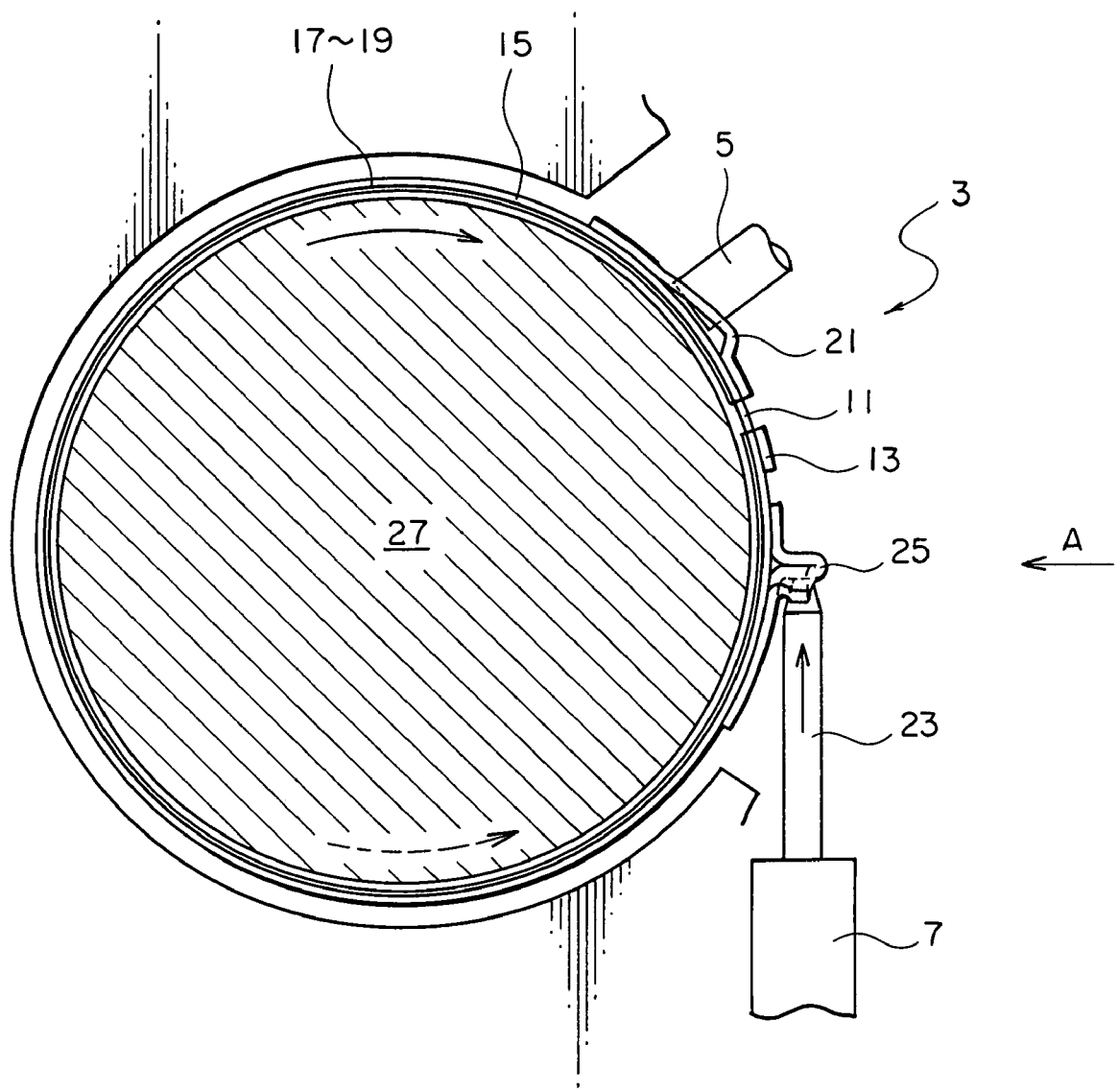
FIG. 1 is a side view showing a double-wrap band brake apparatus according to an embodiment of the present invention.
Figure 2:
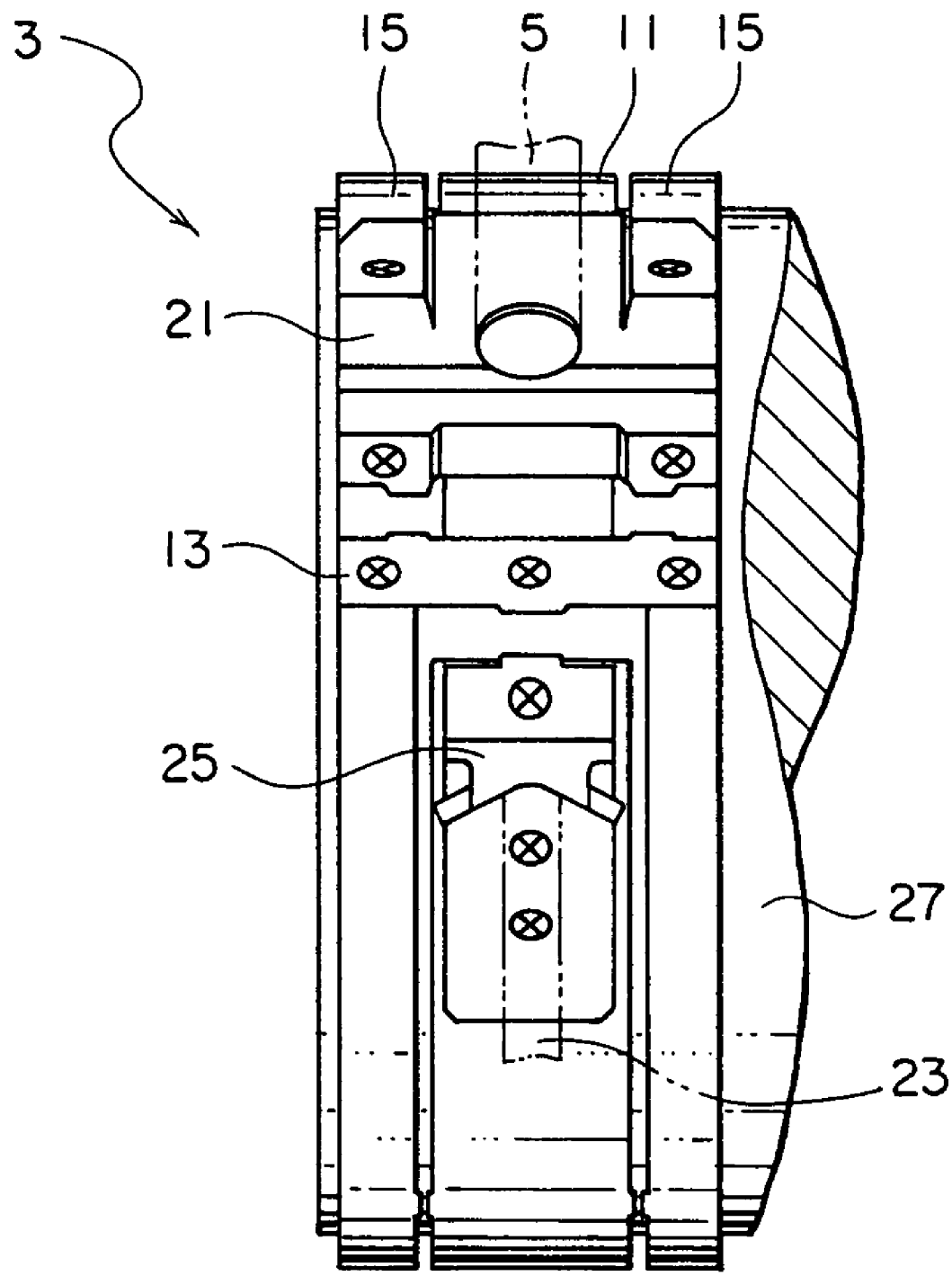
FIG. 2 is a view (front view) seen from the arrow A in FIG. 1.
Figure 3:
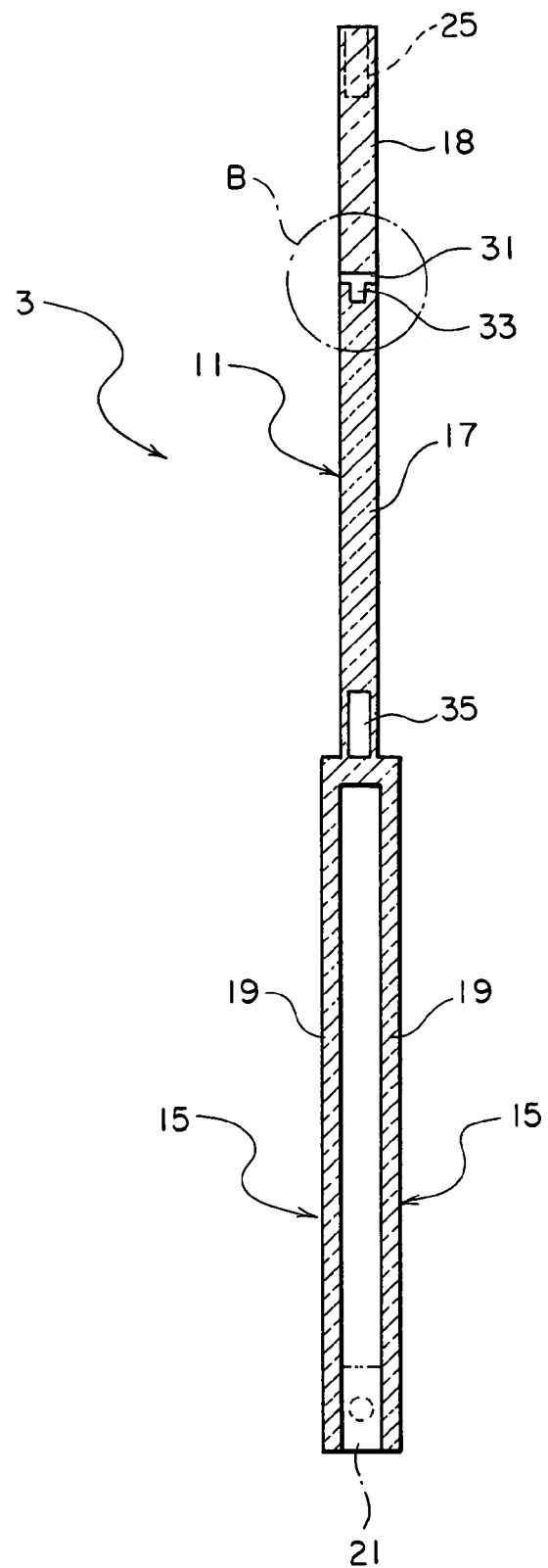
FIG. 3 is a developed view of the double-wrap brake band seen from the frictional surface side.

FIG. 1 is a side view showing a double-wrap band brake apparatus according to a first embodiment of the present invention, FIG. 2 is a view (front view) seen from the arrow A in FIG. 1, FIG. 3 is a developed view of the double-wrap brake band seen from the frictional surface side, FIG. 4 is an enlarged view of the portion B in FIG. 3, and FIG. 5 is a cross-sectional view taken along line C—C in FIG. 4.

As shown in FIGS. 1 and 2, the double-wrap band brake apparatus of the present embodiment is comprised of a main body casing 1 of a transmission, a double-wrap brake band 3 which is set inside the casing 1, an anchor pin 5 for fixing the double-wrap brake band 3 to the casing 1, and an actuator 7 for driving the double-wrap brake band 3.

The double-wrap brake band 3 is comprised of an annular middle band 11 and a pair of annular outer bands 15 which are joined to the middle band 11 through a coupling plate 13 by welding in a state that the free ends of the outer bands 15 are respectively opposed to the free end of the middle band 11. A comparatively thick first frictional member 17 and a comparatively thin second friction member 18 which is disposed on the end portion side of an apply bracket 25 are attached onto the inner peripheral surface of the middle band 11 (in case of the present embodiment, in a range of 90° from the end portion on the apply side), while a frictional member 19 is attached onto the inner peripheral surface of the outer band 15.

An anchor bracket 21 which is latched by the anchor pin 5 on the casing 1 side is welded to an operational end side of the outer band 15, while the apply bracket 25 which receives a force in the direction of contraction of the middle band 11 and the outer band from an apply pin 23 of the actuator 7 is welded to an operational end side of the middle band 11. In this double-wrap brake band 3, when the apply pin 23 of the actuator 7 is operated in the direction indicated by the arrow in FIG. 1, the middle band 11 and the outer bands 15 are contracted, so that the drum 27 fitted in the double-wrap brake band 3 is braked. Note that the double-wrap brake band 3 is lubricated with an automatic transmission fluid (ATF) which is supplied from the axis or central side of the drum 27.

As shown in FIG. 3, in the double-wrap brake band 3 of the present embodiment, the first frictional member 17 and the second frictional member 18 are attached onto the inner peripheral surface of the middle band 11, and the frictional members 19, 19 are, respectively, attached to the inner peripheral surfaces of the outer bands 15, 15. The second frictional member 18 of the middle band 11 is integrally formed with the frictional members 19, 19 of the outer bands 15, 15, and has the same thickness as that of the frictional members 19, 19.

On the other hand, the second frictional member 18 of the middle band 11 is positioned in a predetermined range (about one third of the entire length of the middle band 11) on the apply bracket 25 side and, as shown in FIG. 5, is set to be significantly thinner, compared with the first frictional member 17.

As shown in FIGS. 4 and 5, an oil groove 31 is formed between the first frictional member 17 and the second frictional member 18 to be extended in the axial direction. Meanwhile, the first frictional member 17 is provided with a rectangular dynamic pressure groove 33 which is opened to the oil groove 31 and is extended in the circumferential direction. As shown in FIG. 3, the first frictional member 17 is provided with a rectangular oil reservoir 35 in the vicinity of the frictional members 19 of the outer bands 15.

Figure 6:
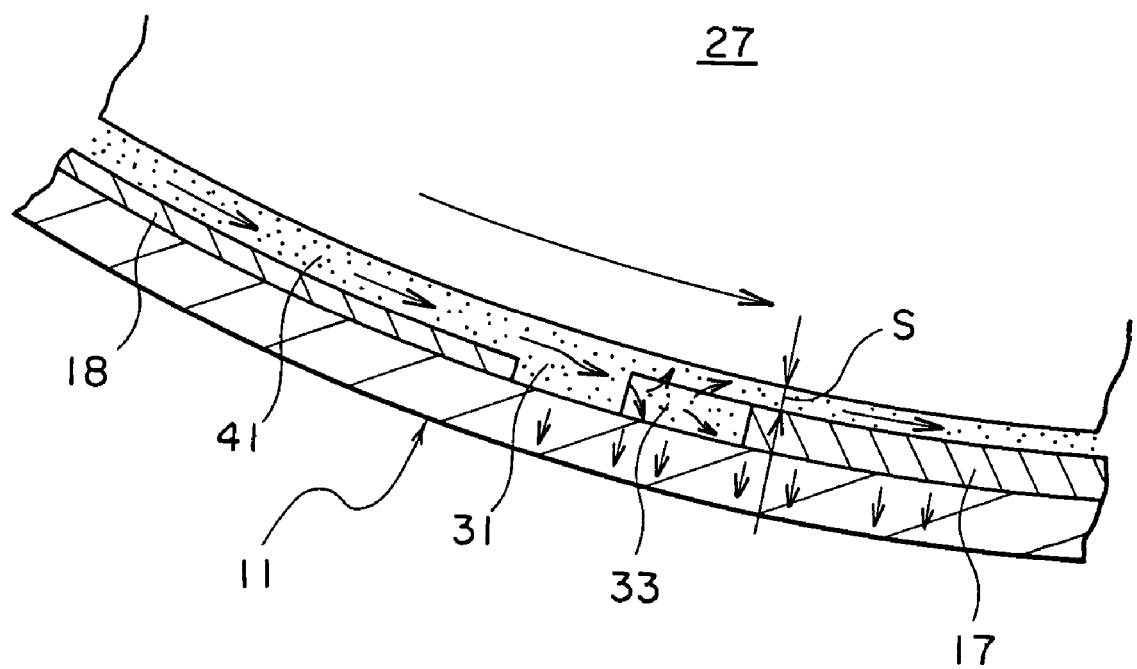
FIG. 6 is an explanatory view showing an operation of the present embodiment.

In the present embodiment, with the structure described above, at the time of deenergy rotation at which the drum 27 is rotated in the reverse direction inside the double-wrap brake band 3 (indicated by the broken line in FIG. 1), the middle band 11 is swollen outward by the pressure of the automatic transmission fluid (ATF) flowing in the dynamic pressure groove 33, as shown in FIG. 6, so that a comparatively large space S is formed between the middle band 11 and the drum 27.

Figure 7:
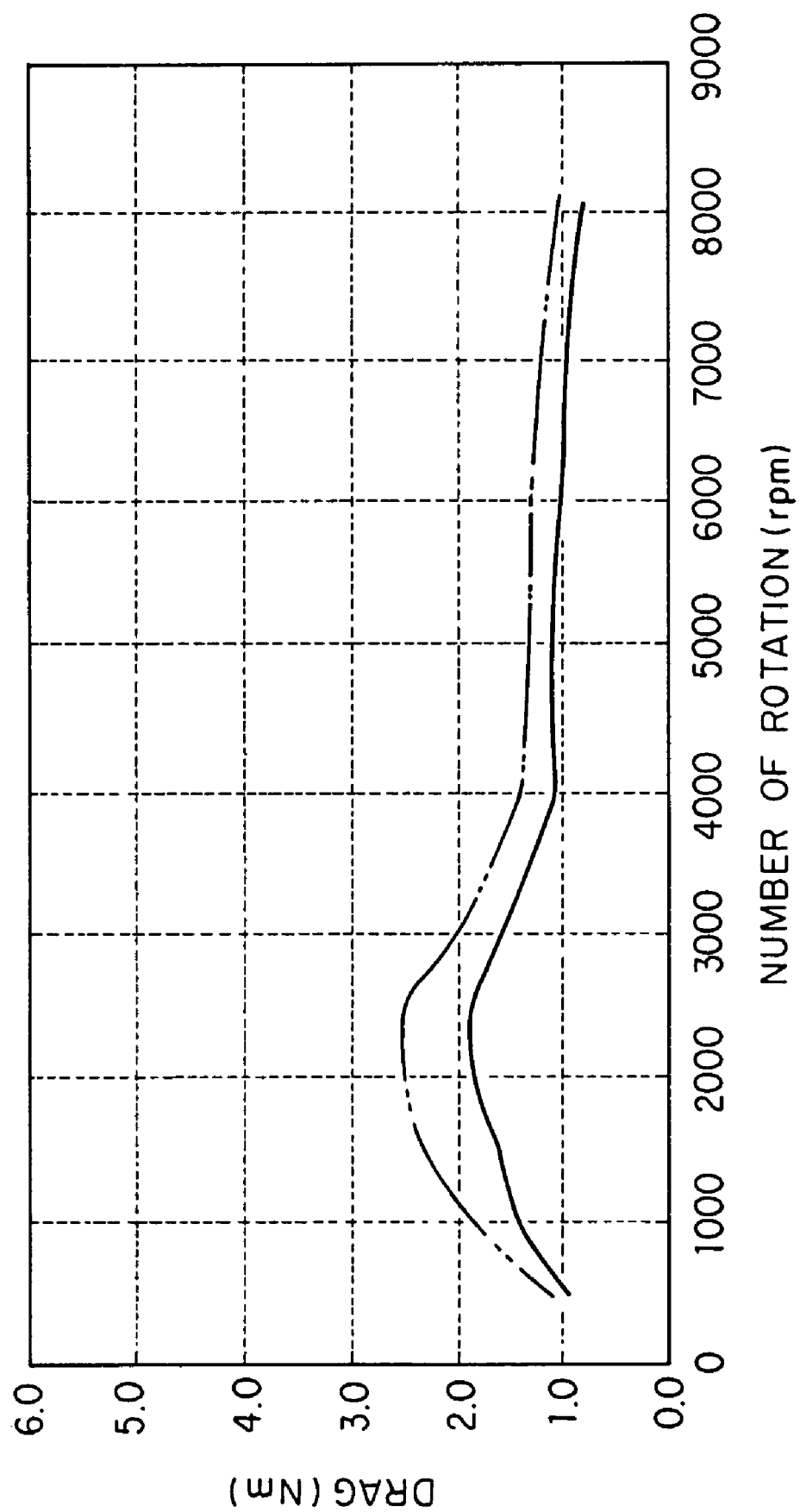
FIG. 7 is a graph showing a relationship between the number of rotations of a drum and a dragging torque.
Figure 8:
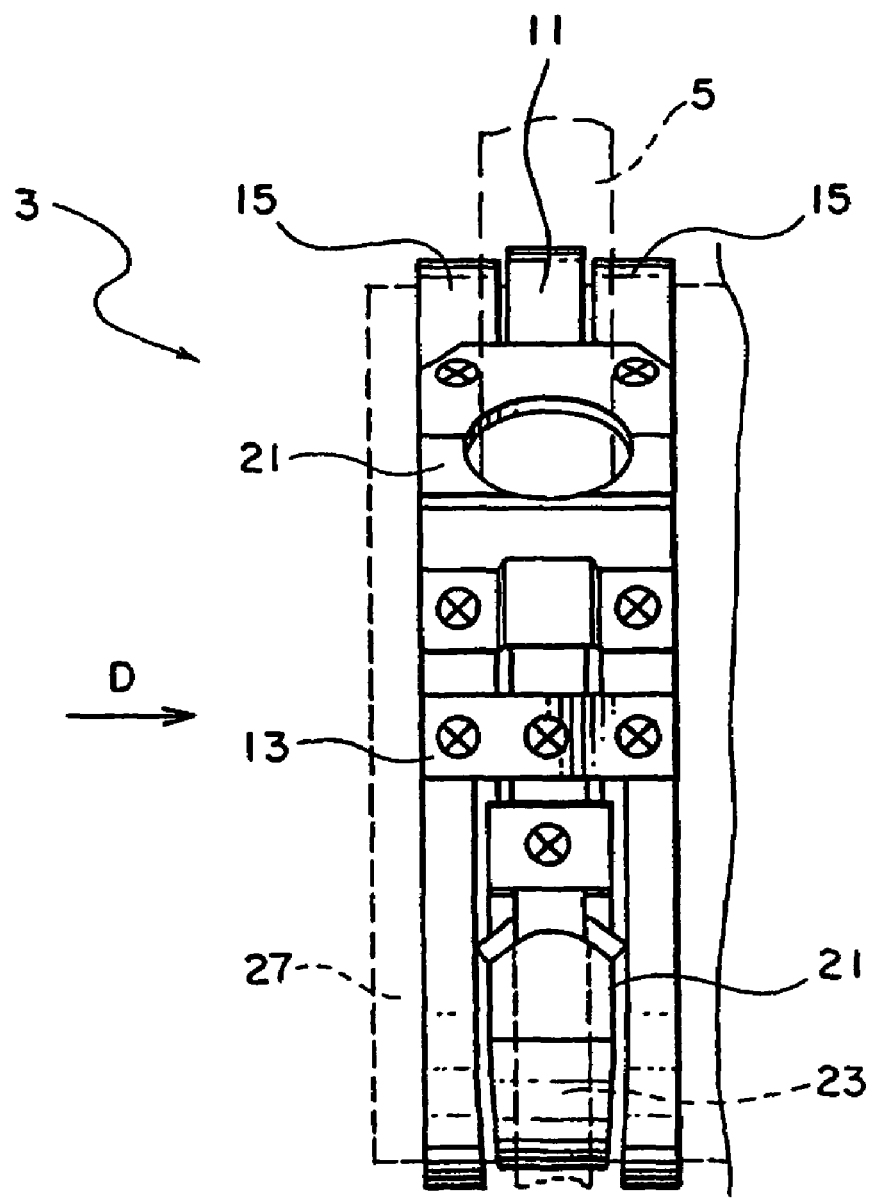
FIG. 8 is a front view showing a conventional double-wrap band brake apparatus.
Figure 9:
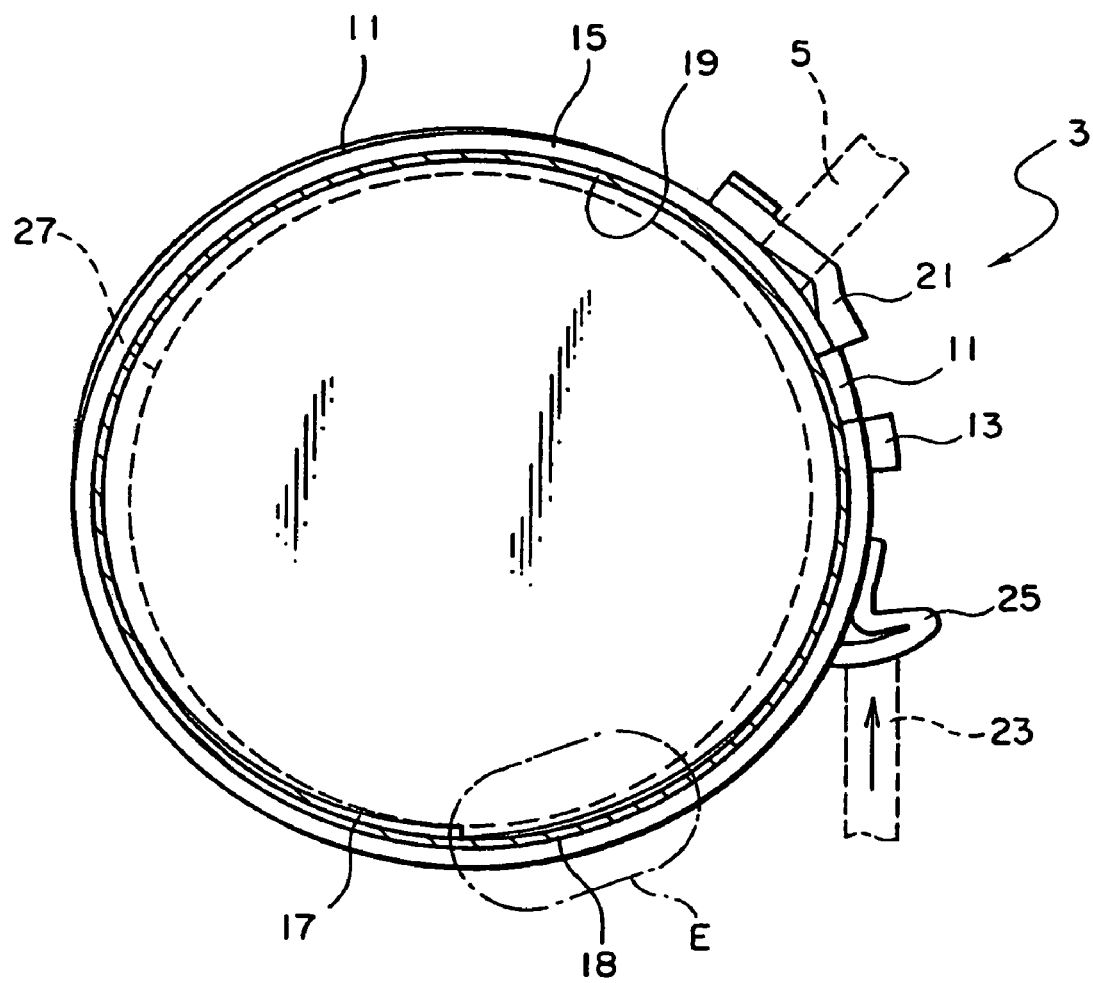
FIG. 9 is a view seen from the arrow D in FIG. 8.

As a result, there is no dragging torque generated due to an increase of the viscous resistance or the fluid resistance of the automatic transmission fluid (ATF), and a loss or the like in the fuel expenses of the car or the driving torque which causes troubles in the conventional apparatuses can be suppressed. FIG. 7 is a graph showing a relationship between the number of rotations of the drum 27 and the dragging torque (drag), from which graph it can be seen that the number of rotations and the drag are significantly small in the present embodiment (indicated by the solid line), compared with those in the conventional apparatus (indicated by the double-dot chain line).

Note that, when the double-wrap brake band 3 which is driven by the apply pin 23 is contracted to come into contact with the drum 27, an oil film 41 which is comparatively thick is formed by the automatic transmission fluid (ATF) existing between the second frictional member 18 and the drum 27 (see FIG. 6). On the first frictional member 17, the surface pressure around the oil reservoir 35 rises to increase the dynamic friction factor, thereby removing the oil film 41.

With such an arrangement, the first frictional member 17 is brought into engagement with the drum 27 by the self engage effect comparatively promptly, meanwhile the second frictional member 18 does not come into engagement with the drum 27 until the oil film 41 between the second frictional member and the drum 27 is removed. As a result, the dynamic friction factor between the double-wrap brake band 3 and the drum 27 rises in a short period of time and, thereafter, is kept substantially constant or fixed. With this structure, the drum 27 can be braked speedily and smoothly, so that the rate of torque transmission reaches 100% in a comparatively short period.

The present invention is not limited to this embodiment. For example, in the foregoing embodiment, the present invention is applied to the double-wrap band brake apparatus which is incorporated in an automatic transmission of a car. However, the present invention may be applied to a double-wrap band brake apparatus employed in an industrial machine or the like. In addition, the specific structures or the like of the double-wrap band brake apparatus including the specific configurations of the first frictional member and the second frictional member can be properly altered in the scope and the spirit of the present invention.

What is claimed is:

1. A double-wrap band brake apparatus having a double wrap brake band for serving to brake a rotating member fitted therein, which comprises:
    an annular middle band with a frictional surface formed on the inner peripheral side thereof;
    a pair of annular outer bands coupled to this middle band in a state that the free ends thereof are respectively opposed to the free end of the middle band and respectively having frictional surfaces formed on the inner peripheral sides thereof;
    an anchor bracket fixed on an operational end side of one of said middle band and said outer bands and latched on a main body casing side; and
    an apply bracket fixed on an operational end side of the other of said middle band and said outer bands to receive a force in the direction of contraction of said middle band and said outer bands from an actuator,
    wherein:
    said middle band is provided, on an inner peripheral surface, with a first circumferentially elongated frictional member and a second circumferentially elongated frictional member which has, at the first frictional member side, a straight end extended in the axial direction, disposed on an end portion side of said apply bracket, and thinner than said first frictional member, and an oil groove extending in the axial direction and formed between a circumferential end of said first frictional member and said straight end of said second frictional member; and
    said middle band is further provided, on the inner peripheral surface, with a dynamic pressure groove which is opened to said oil groove and formed radially through said first frictional member to extend in the circumferential direction from said circumferential end of said first frictional member, whereby dynamic pressure is generated, when said rotating member is rotated, so that said middle band is swollen radially.

2. A double-wrap band brake apparatus according to claim 1, wherein said dynamic pressure groove is formed to extend toward said anchor bracket.

3. A double-wrap band brake apparatus according to claim 1, wherein the depth of said dynamic pressure groove is equal to the thickness of said first frictional member.

4. A double-wrap band brake apparatus according to claim 1, wherein said oil groove and said dynamic pressure groove are disposed in the vicinity of a position at which the inner peripheral surface of said double-wrap brake band is in contact with the outer peripheral surface of said rotating member in a state that said double-wrap brake band is disposed on the outer periphery of said rotating member.

5. A double-wrap band brake apparatus according to claim 2, wherein the depth of said dynamic pressure groove is equal to the thickness of said first frictional member.

6. A double-wrap band brake apparatus according to claim 2, wherein said oil groove and said dynamic pressure groove are disposed in the vicinity of a position at which the inner peripheral surface of said double-wrap brake band is in contact with the outer peripheral surface of said rotating member in a state that said double-wrap brake band is disposed on the outer periphery of said rotating member.

7. A double-wrap band brake apparatus according to claim 1, wherein said oil groove and said dynamic pressure groove are disposed in the vicinity of a position at which the inner peripheral surface of said double-wrap brake band comes closest to the outer peripheral surface of said rotating member in a state that said double-wrap brake band is disposed on the outer periphery of said rotating member.

8. A double-wrap band brake apparatus according to claim 2, wherein said oil groove and said dynamic pressure groove are disposed in the vicinity of a position at which the inner peripheral surface of said double-wrap brake band comes closest to the outer peripheral surface of said rotating member in a state that said double-wrap brake band is disposed on the outer periphery of said rotating member.

* * * * *